United States Patent [19]

Taguchi

[11] Patent Number: 5,684,892
[45] Date of Patent: Nov. 4, 1997

[54] METHOD FOR PATTERN RECOGNITION

[76] Inventor: Genichi Taguchi, 2-12-15 Higashi-Nakano, Nakano-Ku, Tokyo, Japan

[21] Appl. No.: 517,869

[22] Filed: Aug. 22, 1995

[51] Int. Cl.$^6$ .............................. G06K 9/50; G06K 9/46; G06K 9/00
[52] U.S. Cl. .................. 382/193; 382/196; 382/190; 382/187
[58] Field of Search ..................... 382/181, 187, 382/190, 193, 196

[56] References Cited

U.S. PATENT DOCUMENTS 3,244,810  4/1966  Williams ............................ 382/193
3,346,845  10/1967  Fomenko ............................ 382/193

*Primary Examiner*—Leo Boudreau
*Assistant Examiner*—Monica S. Davis
*Attorney, Agent, or Firm*—Skjerven, Morrill, MacPherson, Franklin & Friel

[57] ABSTRACT

A method for pattern recognition is provided which creates statistics in a data base, based upon a number of characteristics extracted from a large number of samples of the pattern to be recognized. The data contains an inverse matrix of a correlation matrix of the characteristics, and the means and standard deviations of the characteristics. When a pattern is received to be recognized, the values of the characteristics of the pattern received are used to compute a Mahalanobis distance. The Mahalanobis distance is computed from the values of the characteristics of the pattern received and the statistics in the data base.

4 Claims, 4 Drawing Sheets

FIGURE 2

| CHARACTERISTIC | NO. OF INTERSECTION POINTS (201a) | | | TOTAL DISTANCE (201b) | | MEAN (203) | STANDARD DEVIATION (204) |
|---|---|---|---|---|---|---|---|
| | HORIZONTAL $p_1$ | VERTICAL $p_2$ | | HORIZONTAL $p_1$ | VERTICAL $p_2$ | | |
| | 1 -- 2 | $i$ | $j$ | | $k$ | | |
| 1 | $Y_{11}$ -- $Y_{21}$ | $Y_{i1}$ | $Y_{j1}$ | -- | $Y_{k1}$ | $m_1$ | $o_1$ |
| 2 | $Y_{12}$ -- $Y_{22}$ | $Y_{i2}$ | $Y_{j2}$ | -- | $Y_{k2}$ | $m_2$ | $o_2$ |
| $\mu$ | $Y_{1\mu}$ -- $Y_{2\mu}$ | $Y_{i\mu}$ | $Y_{j\mu}$ | -- | $Y_{k\mu}$ | $m_\mu$ | -- |
| $n$ | $Y_{1n}$ -- $Y_{2n}$ | $Y_{in}$ | $Y_{jn}$ | -- | $Y_{kn}$ | $m_n$ | -- |
| MEAN | $m_1$ -- $m_2$ | $m_i$ | $m_j$ | -- | $M_k$ | | |
| STANDARD DEVIATION | $o_1$ -- $o_2$ | $T_i$ | $T_j$ | -- | $O_k$ | | |

BASE (202)

200

| CHARACTERISTIC | 1 | 2 | - - - | i | - - - | j | - - - | k |
|---|---|---|---|---|---|---|---|---|
| BASE | $Y_{11}$ | $Y_{21}$ | - - | $Y_{i1}$ | - - | $Y_{j1}$ | - - - | $Y_{k1}$ |
|  | $Y_{12}$ | $Y_{22}$ | - - | $Y_{i2}$ | - - | $Y_{j2}$ | - - - | $Y_{k2}$ |
|  | $\vdots$ | $\vdots$ |  | $\vdots$ |  | $\vdots$ |  | $\vdots$ |
|  | $Y_{1\mu}$ | $Y_{2\mu}$ | - - | $Y_{i\mu}$ | - - | $Y_{j\mu}$ | - - - | $Y_{k\mu}$ |
|  | $\vdots$ | $\vdots$ |  | $\vdots$ |  | $\vdots$ |  | $\vdots$ |
|  | $Y_{1n}$ | $Y_{2n}$ | - - | $Y_{in}$ | - - | $Y_{jn}$ | - - - | $Y_{kn}$ |

METHOD FOR PATTERN RECOGNITION

BACKGROUND OF THE INVENTION

1. Field of the Invention

This invention relates to a method of pattern recognition, and in particular relates to a method for recognizing handwriting or physical shapes.

2. Discussion of the Related Art

The cognitive science of pattern recognition is an area of active research in which the mechanisms and systems in nature (i.e. humans and animals) for performing routine cognitive tasks (e.g. recognition of forms or shapes) are studied. The pattern recognition systems in nature are thought to be based on enormous amounts of input information and experience (i.e. memory), that a practical pattern recognition system based on mimicking such mechanisms and systems of nature is far too complicated and remote even for today's technology.

A practical pattern recognition system implementable in a machine for industrial use, however, need not mimic the mechanisms and systems of nature. For most applications, a practical pattern recognition system which achieves an acceptable level of performance consistently and repeatably suffices. For such a pattern recognition system, a totally artificial method with no analogs in the biological systems of nature is acceptable. Practical tasks for such a pattern recognition system include: (i) recognition of handwritings, (ii) recognition of printed text, and (iii) recognition of objects. It is desired that such a pattern recognition system requires only the minimum amount of information sufficient to perform the desired task within the capabilities of computers today.

SUMMARY OF THE INVENTION

The method of the present invention is based on (i) defining one or more statistics or characteristics from a pattern to be recognized, (ii) collecting the statistics or characteristics from a large number of samples of the pattern to be recognized to generate a data base, (iii) for each sample of a pattern to recognized, computing the Mahalanobis distance of the sample, and (iv) determining from the Mahalanobis distance of the sample whether the sample falls within an acceptable range for recognition of a known pattern.

In one embodiment, the pattern recognizing of the present invention includes the steps of: (i) providing a large number of samples of the pattern to be recognized so as to construct a data base, each sample being provided on a grid formed by two sets of parallel lines; (ii) extracting, from each sample of the pattern, values of one or more characteristics, e.g., for each line in the two sets of parallel lines, (a) the number of points at which such line intersects the sample, and (b) a total distance computed over such points; (iii) for each characteristic, computing a mean value and a standard deviation value of the characteristic from the sample values extracted; (iv) for each pair of characteristics, computing a correlation value; (v) storing the mean values, the standard deviation values and the correlation values in a data base; (vi) whenever an unknown pattern is received, computing (a) a Mahalanobis distance using the values of the characteristics of the unknown pattern, and the stored correlation values, mean values and standard deviation values; and (b) comparing the computed Mahalanobis distance against a predetermined threshold value.

In one embodiment of the present invention, the correlation values are represented by the elements of an inverse matrix computed from a matrix which elements are the correlation function of any two of said characteristics.

In another embodiment of the present invention, the Mahalanobis distance computed is compared against two threshold values. If the Mahalanobis distance is less than the threshold value, a successful pattern recognition signal is declared. If the computed Mahalanobis distance is between the two threshold values, a second method for pattern recognition is invoked as a back-up pattern recognition procedure. If the Mahalanobis distance computed exceeds the greater of the two threshold values, an unsuccessful recognition signal is declared.

The method of the present invention can be implemented using today's computer technology.

The present invention is better understood upon consideration of the detailed description below and the accompanying drawings.

BRIEF DESCRIPTION OF THE DRAWINGS

FIG. 2 illustrates the compilation of data in accordance with the method of the present invention.

FIG. 3 shows normalized data obtained from further compilation of data collected in accordance with the present invention.

DETAILED DESCRIPTION OF THE PREFERRED EMBODIMENTS

Although the method of the present invention is illustrated below by an application in which handwritten characters are recognized, the present invention is equally applicable to such applications as recognition of a printed character, identification of an object according to its shape, or recognition of a voice signature.

Figure 1:
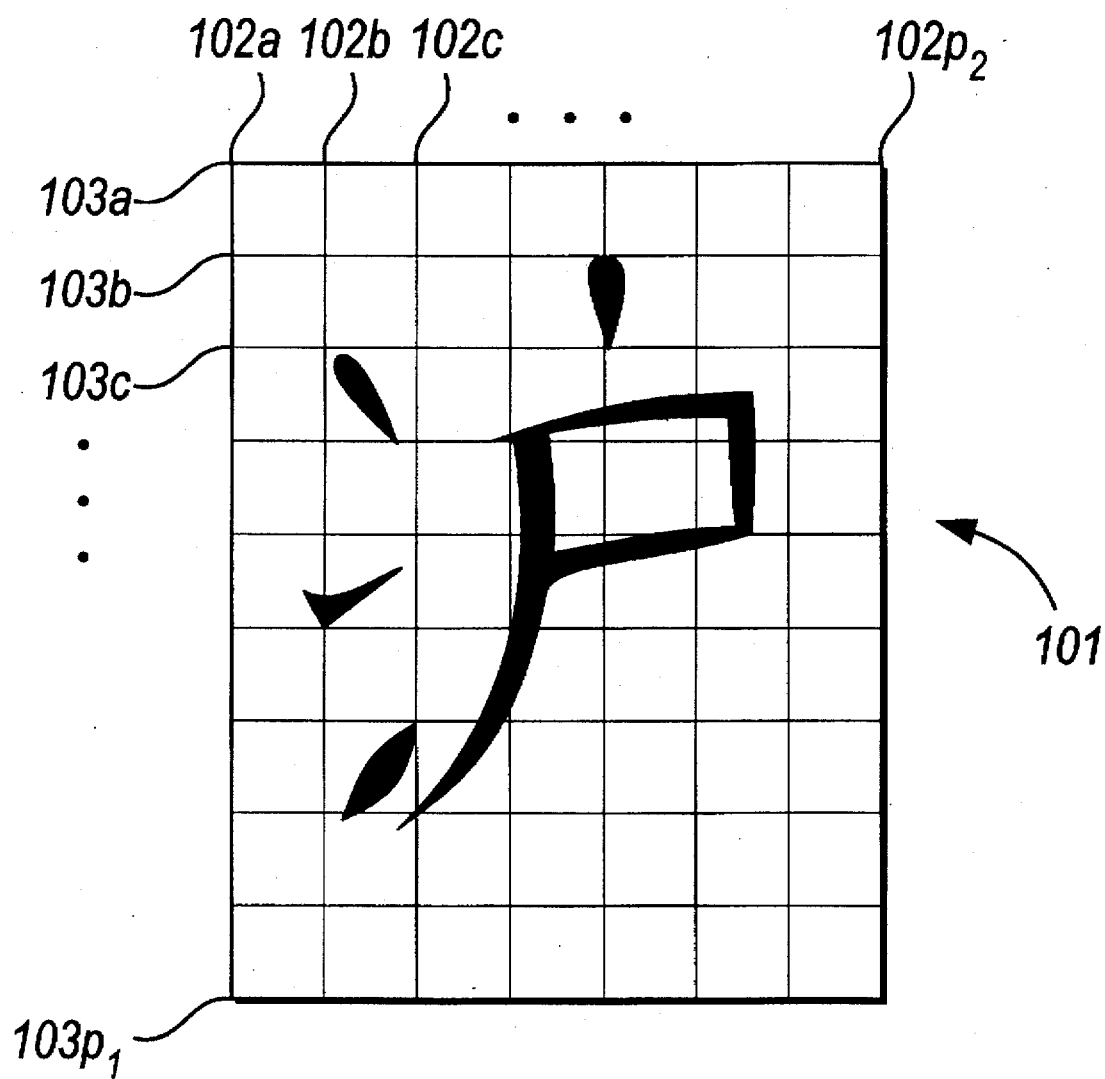
FIG. 1 illustrates a procedure for collecting data used for recognizing a handwritten or printed character, in accordance with the method of the present invention.

FIG. 1 illustrates a procedure for collecting data used for recognizing a handwritten character, in accordance with the method of the present invention. As shown in FIG. 1, a kanji character 101 is provided in an area on which a rectangular grid is defined. FIG. 1 shows a number of horizontal lines $103a$–$103p_1$ spaced in predetermined intervals. Likewise, a number of vertical lines $102a$–$102p_2$ are provided, spaced also in predetermined intervals. It should be recognized that the numbers of vertical and horizontal lines shown in FIG. 1 are shown for illustrative purposes only, depending upon the level of performance required, the actual numbers of vertical and horizontal lines, i.e. the resolution of the grid, used in any practical implementation are determined empirically. Using this grid, a number of statistics can be collected. In this description, the term "statistic" denotes a function of an observable quantity, such as the number of points at which a line of the grid intersects with a handwritten character. For the purpose of the present illustration, two statistics for each horizontal or vertical line are collected. First, for each horizontal or vertical line, the number of grid points on the horizontal or vertical line that lie on the kanji character is counted. Second, for each horizontal or vertical line, a total distance is computed by summing all distances between any two adjacent points on such a line which lie on the Kanji character. If the kanji character lies on only a single point of the horizontal or vertical line, the distance is zero. These statistics are collected from a large number (n) of handwriting samples of the same kanji character.

The statistics of a particular kanji character, i.e., number of grid points lying on the kanji character ("number of intersecting points") and the computed total distance, are tabulated in table 200 of FIG. 2. As shown in FIG. 2, section 201a provides, for each of the $(p_1+p_2)$ horizontal or vertical lines, a column i of values $Y_{i1} \ldots Y_{in}$, where $1 \leq i \leq p_1+p_2$, each value $Y_{i\mu}$ being the number of intersecting points collected from that line for the μth handwriting sample, $1 \leq \mu \leq n$. Likewise, section 201b provides, for each of the horizontal or vertical lines, a column i of the computed total distances $Y_{i\mu} \ldots Y_{in}$, where $p_1+p_2+1 \leq i \leq 2(p_1+p_2)$ and $Y_{i\mu}$ denotes the computed total distance for that line for the μth handwriting sample, $1 \leq \mu \leq n$. To simplify the notation used in this description, the columns of in the sections 201a and 201b, are enumerated in FIG. 2 as lines 1 through k (i.e., $k=2(p_1+p_2)$, and the values of the statistics in each column represent a quantity which is referred to below as a "characteristic".

The mean $(m_i)$ for each column, $1 \leq i \leq k$, is then computed and provided on row 203. Similarly, the standard deviation $(\sigma_i)$ for each column, $1 \leq i \leq k$, is computed and provided on row 204. In this embodiment, in compiling the table of FIG. 2, horizontal or vertical lines which do not include any grid points lying on any of the n handwriting samples are not included in the $p_1$ horizontal and the $p_2$ vertical lines.

The data in FIG. 2 is then normalized. The normalized values $y_{i\mu}$, where $1 \leq i \leq k$ and $1 \leq \mu \leq n$, are tabulated in table 301 of FIG. 3. The value $Y_{i\mu}$ of table 301 is related to the value $Y_{i\mu}$ in table 200 by:

$$y_{i\mu} = \frac{Y_{i\mu} - m_i}{\sigma_i}$$

A correlation matrix R of size (k by k) is then computed. Correlation matrix R takes the form:

$$R = \begin{bmatrix} 1 & r_{12} & \ldots & r_{1k} \\ r_{21} & 1 & \ldots & r_{2k} \\ \ldots & \ldots & \ldots & \ldots \\ \ldots & \ldots & \ldots & \ldots \\ r_{k1} & r_{k2} & \ldots & 1 \end{bmatrix}$$

where each element $r_{ij}$, $i \neq j$, is computed by the relation:

$$r_{ij} = \frac{1}{n-1} \sum_{\mu=1}^{n} y_{i\mu} y_{j\mu}$$

The inverse matrix $R^{-1}$ of matrix R is then computed. If the inverse matrix $R^{-1}$ is not available, as a result of co-linearity among the characteristics, one or more of the characteristics is removed until the co-linearity is avoided. In the description below, the elements of inverse matrix $R^{-1}$ is denoted by $a_{ij}$, $1 \leq i \leq k$ and $1 \leq j \leq k$. Hence, inverse matrix $R^{-1}$ takes the form:

$$R^{-1} = \begin{bmatrix} a_{11} & a_{12} & \ldots & a_{1k} \\ a_{21} & a_{22} & \ldots & a_{2k} \\ \ldots & \ldots & \ldots & \ldots \\ \ldots & \ldots & \ldots & \ldots \\ a_{k1} & a_{k2} & \ldots & a_{kk} \end{bmatrix}$$

where the mean $m_i$ and the standard deviation $\sigma_i$ of each column 1 of table 200, $1 \leq i \leq k$, and the elements $a_{ij}$ of the matrix $R^{-1}$, $1 \leq i \leq k$ and $1 \leq j \leq k$, are stored in a data base for subsequent pattern recognition.

When a character is received to be recognized, the character is superimposed onto the grid defined above in FIG. 1. The values $Y_1 \ldots Y_k$, corresponding to the values of the characteristics as defined above with respect to table 200, are computed. The Mahalanobis distance of the character received, denoted $D^2$, is then computed over the $Y_i$'s ($1 \leq i \leq k$) using the mean $m_i$ and the standard deviations $\sigma_i$ of each characteristic, and the elements $a_{ij}$'s of the stored matrix $R^{-1}$, $1 \leq i \leq k$ and $1 \leq j \leq k$, according to the following equation:

$$D^2 = \frac{1}{k} \sum_{\substack{i,j=1 \\ j \neq i}}^{k} a_{ij} \left( \frac{Y_i - m_i}{\sigma_i} \right) \left( \frac{Y_j - m_j}{\sigma_j} \right)$$

The Mahalanobis distance $D^2$ thus calculated is then compared to a predetermined threshold value, such as 2.0, for a determination of whether the pattern received is the pattern of the data base. If the Mahalanobis distance $D^2$ is greater than the threshold, it will be recognized that the character received is not the character used to create the matrix $R^{-1}$ above. Otherwise, it will be recognized that the character received is the character used to create the matrix $R^{-1}$ above.

Figure 4:
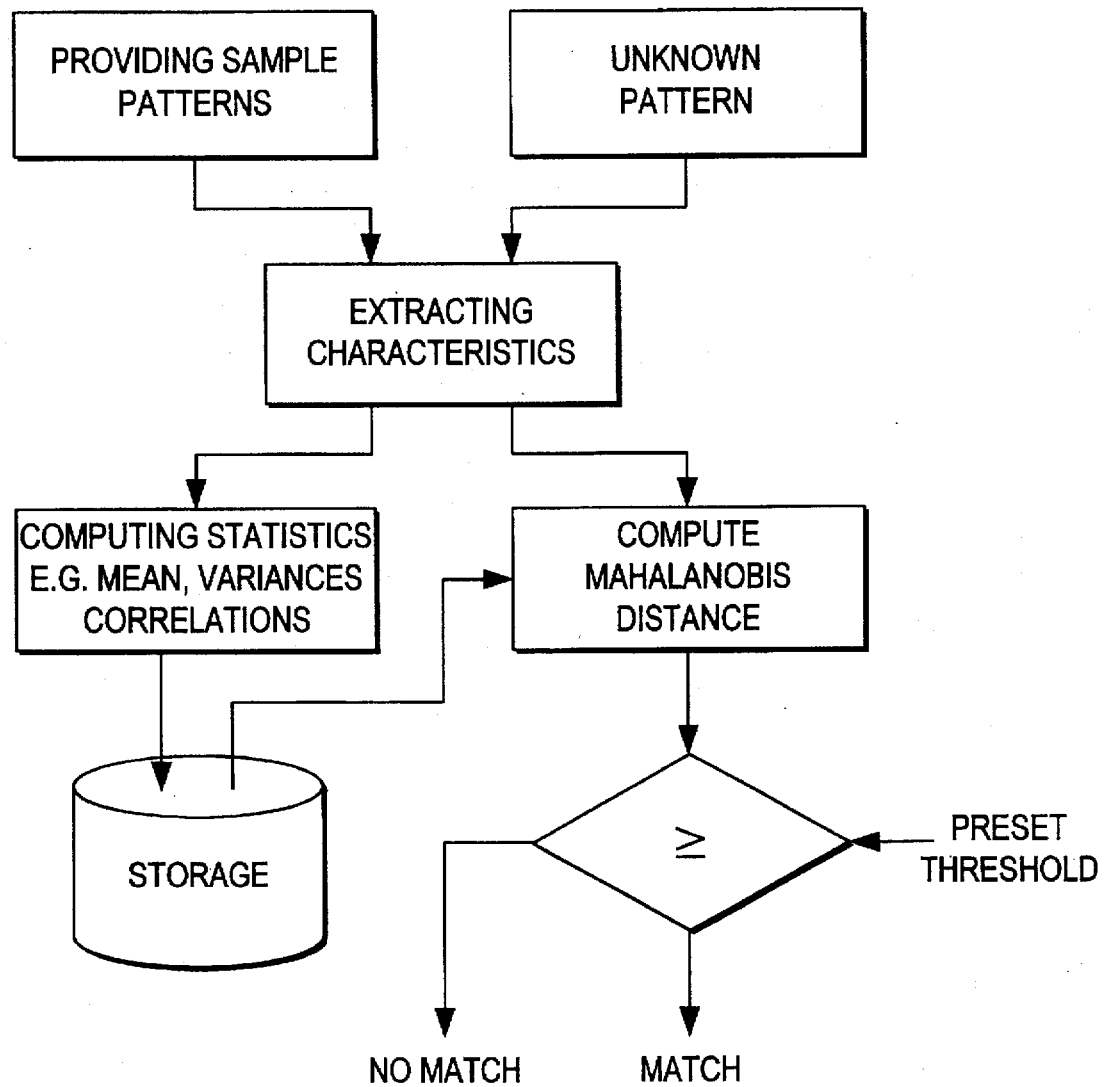
FIG. 4 is a flow diagram summary of one embodiment of a method of the present invention.

FIG. 4 summarizes in flow diagram form the method of the present invention described in detail above in conjunction of FIGS. 1–3.

The above detailed description is provided to illustrate the specific embodiments of the present invention and is not intended to be limiting. Modifications and variations within the scope of the present invention are possible. For example, two threshold numbers $T_1$ and $T_2$, $T_1 < T_2$, can be used. In that instance, the character received is (i) recognized to be the character used to create matrix $R^{-1}$ if the Mahalanobis distance $D^2$ is less than $T_1$, (ii) provided to another recognition procedure (e.g. user manual intervention), if the Mahalanobis distance $D^2$ is between $T_1$ and $T_2$, and (iii) rejected, if the Mahalanobis distance $D^2$ is greater than $T_2$. The present invention is defined by the following claims.

I claim:

1. A method for recognizing a pattern, comprising the steps of:
    providing a plurality of samples of said pattern, each sample provided on a grid formed by first and second sets of parallel lines;
    extracting, from each sample of said pattern, values of a plurality of characteristics, said plurality of characteristics including, for each line of said first and second sets of parallel lines, (i) a first value representing the number of points at which said line intersects said sample, and (ii) a total distance computed over said points;
    for each characteristic, computing a mean value and a standard deviation value;
    for each pair of characteristics, computing a correlation value;
    storing said mean values, said standard deviation values and said correlation values;
    receiving an unknown pattern;
    extracting said values of said plurality of characteristics from said unknown pattern;
    calculating a Mahalanobis distance based on said values of said plurality of characteristics extracted from said unknown pattern, said correlation values, said mean values and said standard deviation values; and
    comparing said Mahalanobis distance against a predetermined threshold value.

2. A method as in claim 1, wherein said correlation values are represented by the elements of an inverse matrix computed from a matrix which elements are the correlation function of any two of said characteristics.

3. A method as in claim 1, wherein said step of comparing compares said Mahalanobis distance against a first threshold value and a second threshold value, wherein (i) if said Mahalanobis distance is less than said first threshold value, a successful pattern recognition signal is issued, (ii) if said Mahalanobis distance is between said first and second threshold values, a second method for recognizing a pattern is invoked, and (iii) if said Mahalanobis distance exceeds said second threshold value, an unsuccessful recognition signal is issued.

4. A method as in claim 1, wherein said extracting step further comprises the step of excluding from said first and second sets of parallel lines which do not intersect any of said samples.

* * * * *